(12) United States Patent
Kelly et al.

(10) Patent No.: US 7,537,849 B2
(45) Date of Patent: May 26, 2009

(54) SOLID-OXIDE FUEL CELL ASSEMBLY HAVING A CONVECTIVELY VENTED STRUCTURAL ENCLOSURE

(75) Inventors: Sean M. Kelly, Brighton, NY (US); Michael T. Faville, Geneseo, NY (US); Kevin R. Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 954 days.

(21) Appl. No.: 10/238,093

(22) Filed: Sep. 10, 2002

(65) Prior Publication Data

US 2004/0048123 A1 Mar. 11, 2004

(51) Int. Cl.
*H01M 8/04* (2006.01)
*H01M 8/12* (2006.01)
*H01M 8/06* (2006.01)
*B60L 11/18* (2006.01)

(52) U.S. Cl. .............................. 429/26; 429/19; 429/32; 429/38; 180/65.3

(58) Field of Classification Search .................... 429/13, 429/16, 17, 19, 20, 22, 24, 26, 30, 31, 32, 429/34, 35, 38, 39, 45, 62, 69, 23; 320/101; 180/65.3, 65.1; 62/3.7; 123/696; 701/22
See application file for complete search history.

(56) References Cited

U.S. PATENT DOCUMENTS

| | | | | |
|---|---|---|---|---|
| 3,297,485 A | * | 1/1967 | Tocker | 429/33 |
| 3,389,018 A | * | 6/1968 | Dowgiallo, Jr. | 429/23 |
| 5,480,738 A | * | 1/1996 | Elangovan et al. | 429/32 |
| 5,715,808 A | * | 2/1998 | Wilhoite | 126/85 B |
| 5,976,724 A | * | 11/1999 | Bloomfield | 429/21 |
| 6,608,463 B1 | * | 8/2003 | Kelly et al. | 320/101 |
| 6,627,339 B2 | * | 9/2003 | Haltiner, Jr. | 429/17 |
| 2001/0049039 A1 | * | 12/2001 | Haltiner, Jr. | 429/24 |

FOREIGN PATENT DOCUMENTS

JP 2000315513 A * 11/2000

OTHER PUBLICATIONS

U.S. Appl. No. 10/178,114—Claims Only.*
U.S. Appl. No. 10/178,878—Claims Only.*
Official English Translation of JP 2000-315513.*

* cited by examiner

*Primary Examiner*—Patrick Ryan
*Assistant Examiner*—R. Hodge
(74) *Attorney, Agent, or Firm*—Paul L Marshall

(57) ABSTRACT

In a solid-oxide fuel cell system, the fuel cell stacks, the fuel reformer, tail gas combuster, heat exchangers, and fuel/air manifold, are contained in a "hot zone" within a thermal enclosure. A separate and larger structural enclosure surrounds the thermal enclosure, defining a "cool zone" outside the thermal enclosure for incorporation of "cool" components such as the air supply system and the electronic control system. To prevent unwanted temperature rise in the cool zone during shutdown, from residual heat escaping from the hot zone through the thermal enclosure, the structural enclosure is provided with vents through the lower and upper walls thereof to permit thermal convective circulation of air through the enclosure. The vents are baffled to prevent entry of splash and other contaminants, and the lower vent is provided with a float valve to prevent flooding of the enclosure in event of immersion of the SOFC system.

17 Claims, 16 Drawing Sheets

SOLID-OXIDE FUEL CELL ASSEMBLY HAVING A CONVECTIVELY VENTED STRUCTURAL ENCLOSURE

TECHNICAL FIELD

The present invention relates to hydrogen/oxygen fuel cells having a solid-oxide electrolytic layer separating an anode layer from a cathode layer; more particularly, to fuel cell assemblies comprising a plurality of individual fuel cells in a stack wherein air and reformed fuel are supplied to the stack; and most particularly, to a fuel cell system wherein a structural enclosure has vents to allow convective removal of unwanted heat.

BACKGROUND OF THE INVENTION

Fuel cells which generate electric current by the electrochemical combination of hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is known to stack together, in electrical series, a plurality of cells. Because each anode and cathode must have a free space for passage of gas over its surface, the cells are separated by perimeter spacers which are selectively vented to permit flow of gas to the anodes and cathodes as desired but which form seals on their axial surfaces to prevent gas leakage from the sides of the stack. The perimeter spacers may include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack.

An enclosure for a fuel cell system has two basic functions. The first is to provide thermal insulation for some of the components which must function at an elevated temperature (700-900° C.) to maintain them at that temperature for efficient operation, to protect lower temperature components, and to reduce the exterior temperature over the overall unit to a human-safe level. The second is to provide structural support for mounting of individual components, mounting the system to another structure such as a vehicle, protection of the internal components from the exterior environment, and protection of the surrounding environment from the high temperatures of the fuel cell assembly.

In at least one embodiment of a solid-oxide fuel cell system, the "hot" components, e.g., the fuel cell stacks, the fuel reformer, tail gas combuster, heat exchangers, and fuel/air manifold, are contained in a "hot zone" within a thermal enclosure. The thermal enclosure is intended specifically for minimizing heat transfer to its exterior and has no significant structural or protective function for its contents. A separate and larger structural enclosure surrounds the thermal enclosure, defining a "cool zone" outside the thermal enclosure for incorporation of "cool" components, e.g., the air supply system and the electronic control system. During operation of the system, there is typically air exchange between the environment outside the SOFC and the cool zone via the process air pump and air filtration system. Thus, the cool zone has active cooling during operation of the SOFC system.

A problem can arise, however, when the system is in a shut-down mode. The hot zone components are hot immediately after shutdown, and the active cooling of the cool zone is also shut down. Thus, heat escaping from the thermal enclosure can cause temperatures to rise undesirably in the cool zone of the structural enclosure.

What is needed is a means for automatically causing the structural enclosure to be cooled, even when the active cooling of the system is shut down.

It is a principal object of the present invention to provide means for automatic self-cooling of the structural enclosure of an SOFC system.

It is a further object of the invention to increase the reliability and safety of operation of such a fuel cell system.

BRIEF DESCRIPTION OF THE INVENTION

Briefly described, in a solid-oxide fuel cell system, the "hot" components, e.g., the fuel cell stacks, the fuel reformer, tail gas combuster, heat exchangers, and fuel/air manifold, are contained in a "hot zone" within a thermal enclosure. The thermal enclosure is intended specifically for minimizing heat transfer to its exterior and has no significant structural or protective function for its contents. A two-part clamshell arrangement allows all piping and leads which must pass through the enclosure to do so at the join line between the parts, thus eliminating need for ports and fittings in the thermal enclosure. A separate and larger structural enclosure surrounds the thermal enclosure, defining a "cool zone" outside the thermal enclosure for incorporation of "cool" components, e.g., the air supply system and the electronic control system.

To prevent unwanted temperature rise in the cool zone during shutdown, from residual heat escaping from the hot zone through the thermal enclosure, the structural enclosure is provided with vents through the upper and lower walls thereof to permit convective circulation of air through the enclosure. Preferably, the vents are filtered and baffled as by labyrinthine means, to prevent entry of splash and other contaminants, and are provided with float valves to prevent flooding of the enclosure in event of immersion of the SOFC system.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
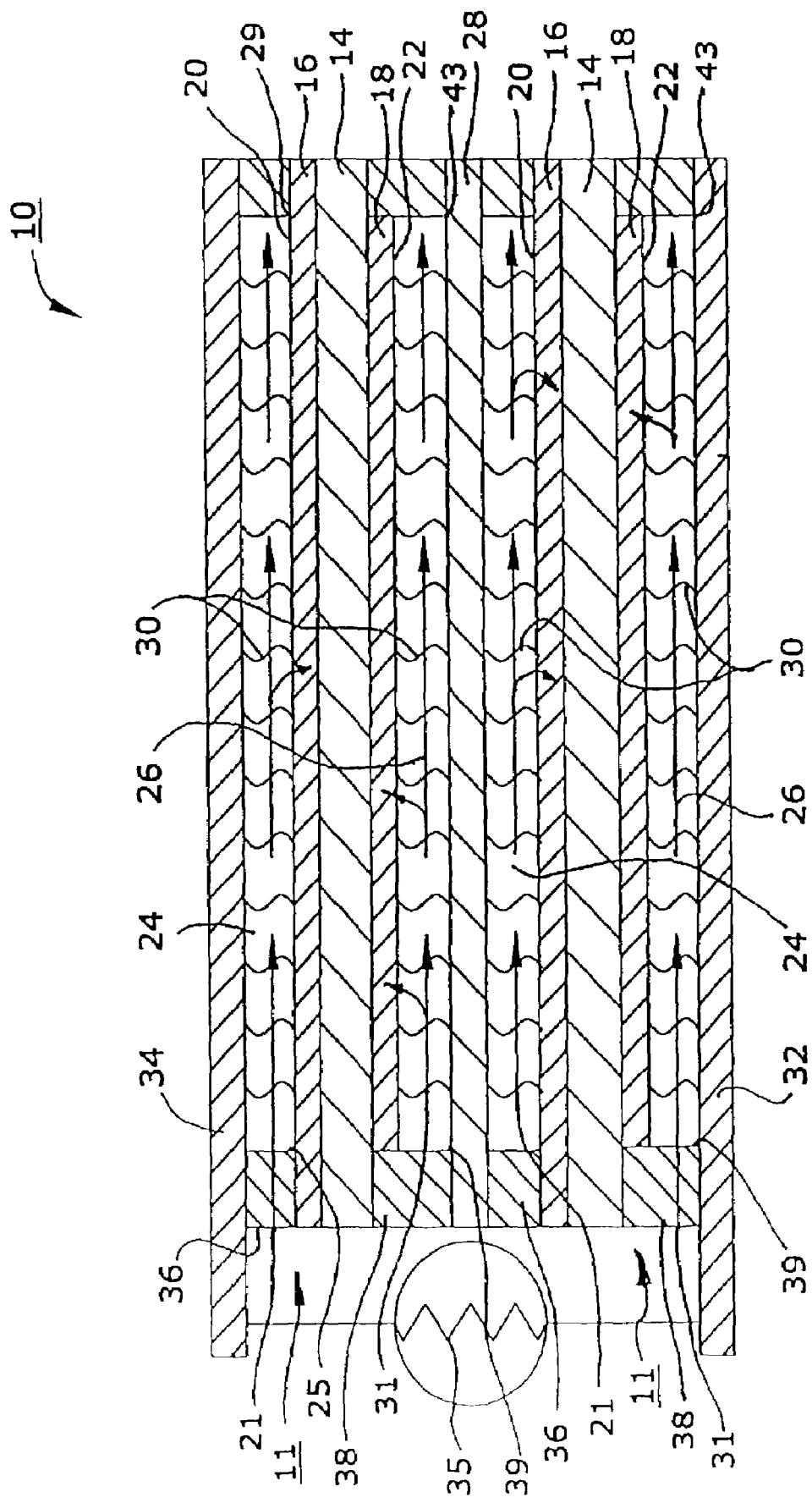
FIG. 1 is a schematic cross-sectional view of a two-cell stack of solid oxide fuel cells.

Referring to FIG. 1, a fuel cell stack 10 includes elements known in the art of solid-oxide fuel cell stacks comprising more than one fuel cell. The example shown includes two identical fuel cells 11, connected in series, and is of a class of such fuel cells said to be "anode-supported" in that the anode is a structural element having the electrolyte and cathode deposited upon it. Element thicknesses as shown are not to scale.

Each fuel cell 11 includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of one fuel cell 11 faces and is electrically connected to an interconnect 28 by filaments 30 extending across but not blocking passageway 24. Similarly, cathode 18 of fuel cell 11 faces and is electrically connected to interconnect 28 by filaments 30 extending across but not blocking passageway 26. Similarly, cathode 18 of a second fuel cell 11 faces and is electrically connected to a cathodic current collector 32 by filaments 30 extending across but not blocking passageway 26, and anode 16 of fuel cell 11 faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Anode spacer 36 and cathode spacer 38 are formed from sheet stock in such a way as to yield the desired height of the anode passageways 24 and cathode passageways 26.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction which can be orthogonal to the first direction of the reformate (second direction shown in the same direction as the first for clarity in FIG. 1), and is removed at a second and opposite edge 43 of cathode surface 22. Molecular oxygen gas ($O_2$) diffuses into the cathode and is catalytically reduced to two $O^{-2}$ anions by accepting four electrons from the cathode and the cathodic current collector 32 or the interconnect 28 via filaments 30. The electrolyte ionically conducts or transports $O^{-2}$ anions to the anode electrolyte innerface where they combine with four hydrogen atoms to form two water molecules, giving up four electrons to the anode and the anodic current collector 34 or the interconnect 28 via filaments 30. Thus cells 11 are connected in series electrically between the two current collectors, and the total voltage and wattage between the current collectors is the sum of the voltage and wattage of the individual cells in a fuel cell stack.

Figure 2:
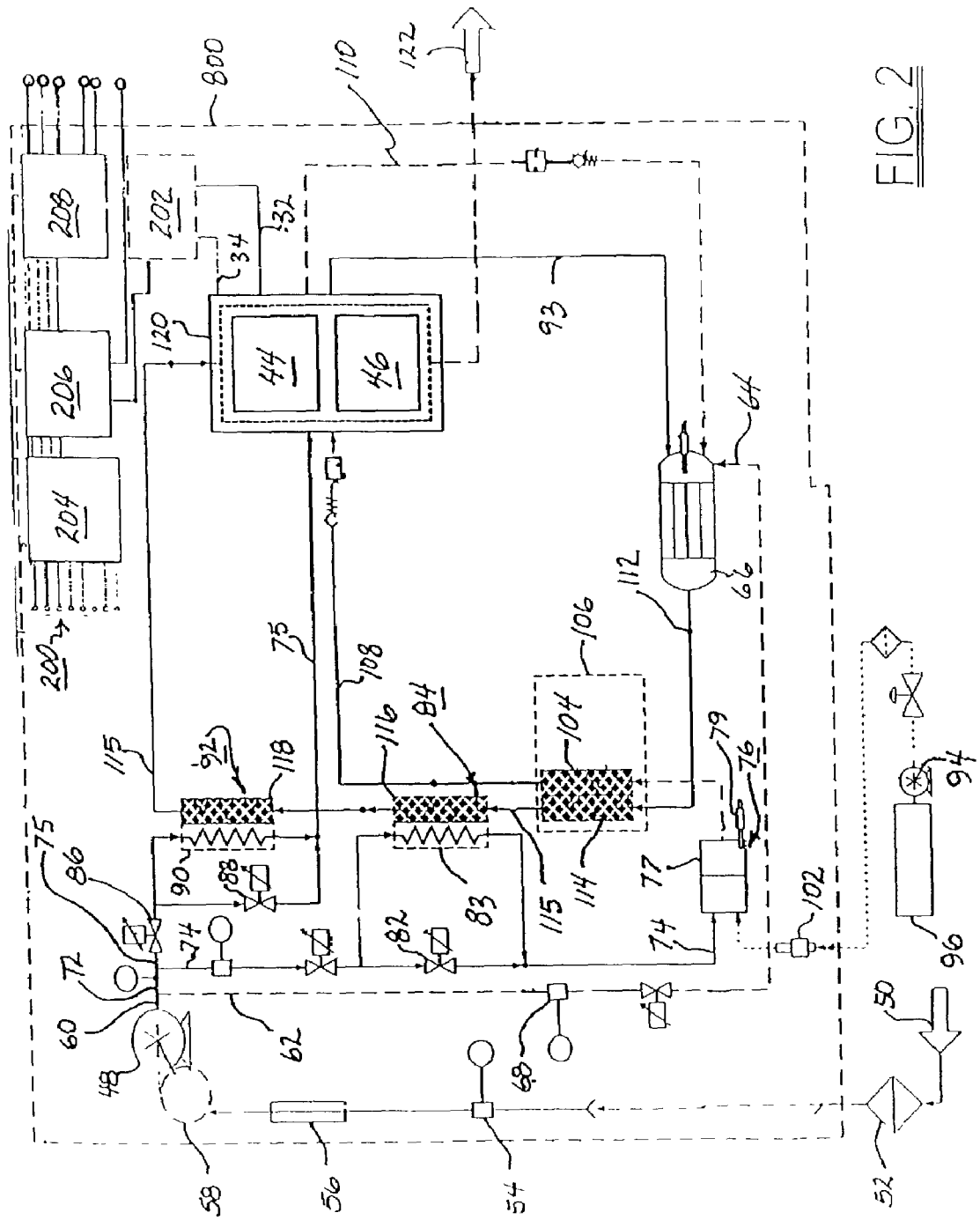
FIG. 2 is a schematic mechanization diagram of an SOFC system in accordance with the invention.
Figure 3:
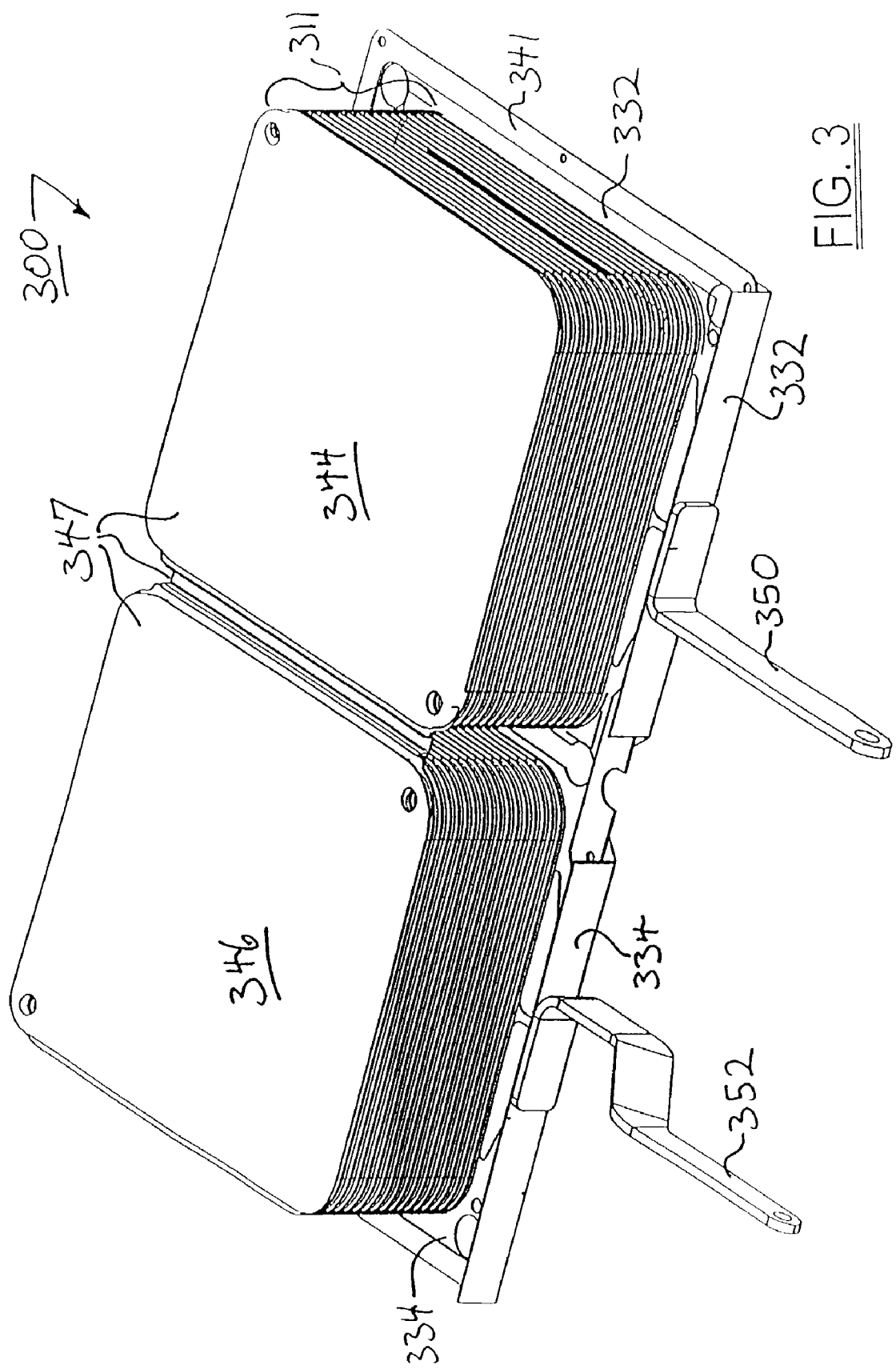
FIG. 3 is an isometric view from above of a two-stack fuel cell assembly, shown connected electrically in series between two current collectors.
Figure 4:
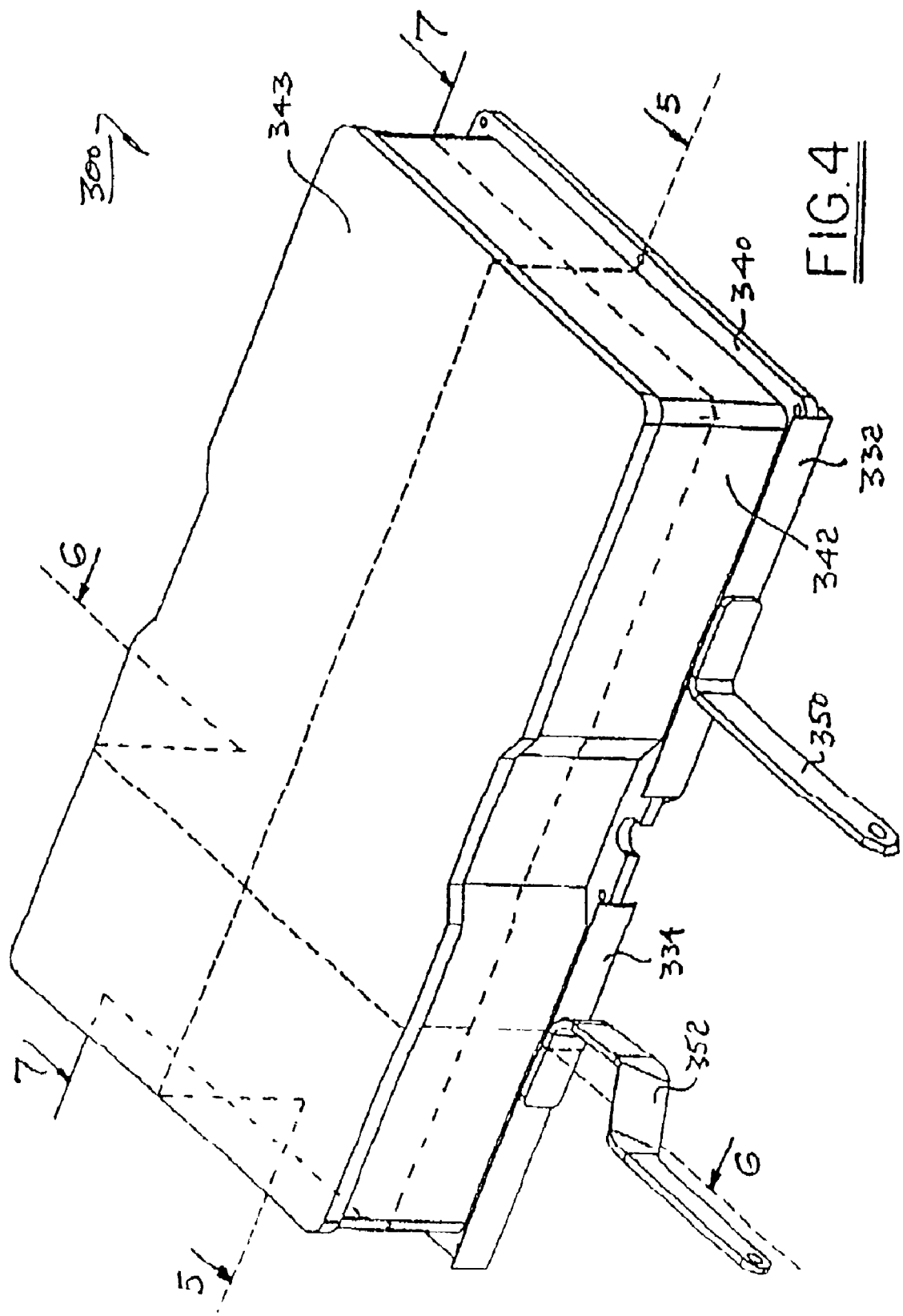
FIG. 4 is an isometric view like that shown in FIG. 3, with a cover enclosing the stacks.
Figure 5:
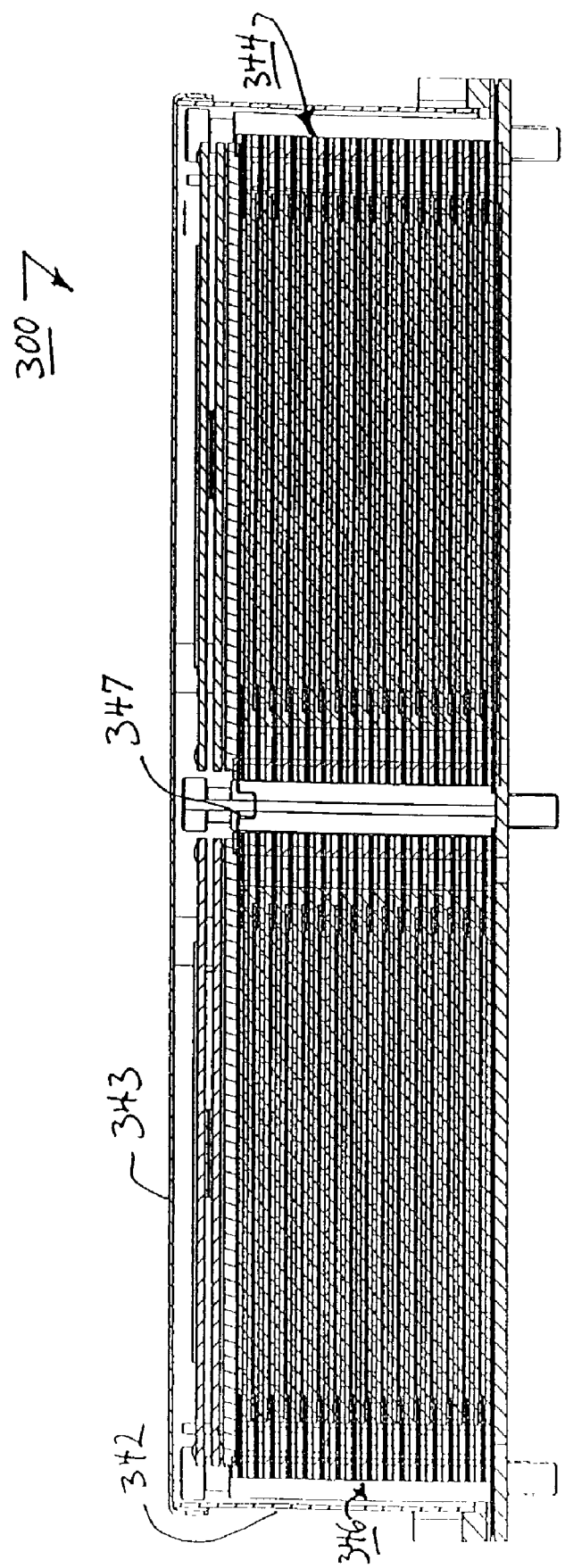
FIG. 5 is an elevational cross-sectional view taken along line 5-5 in FIG. 4.
Figure 6:
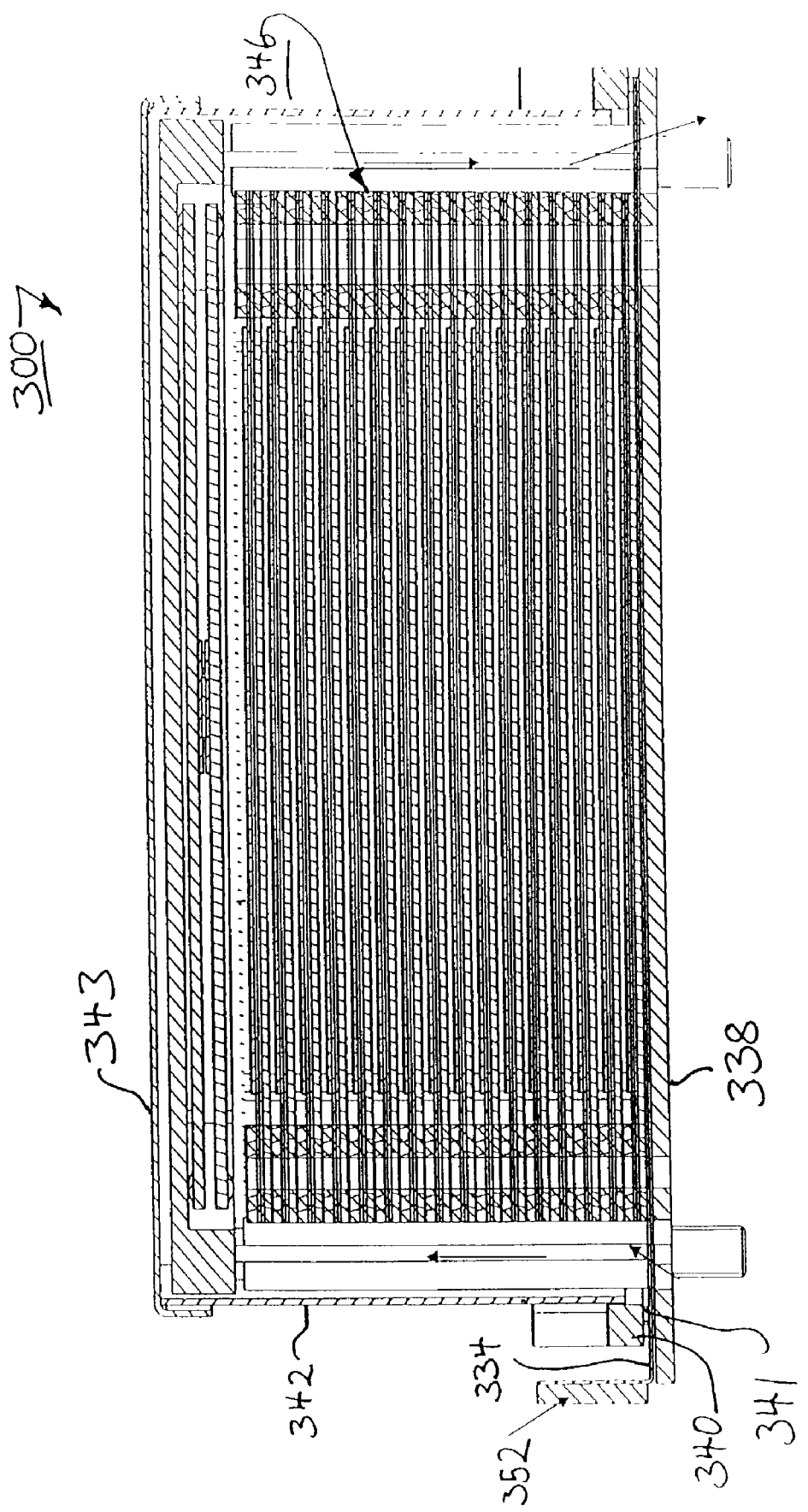
FIG. 6 is an elevational cross-sectional view taken along line 6-6 in FIG. 4.
Figure 7:
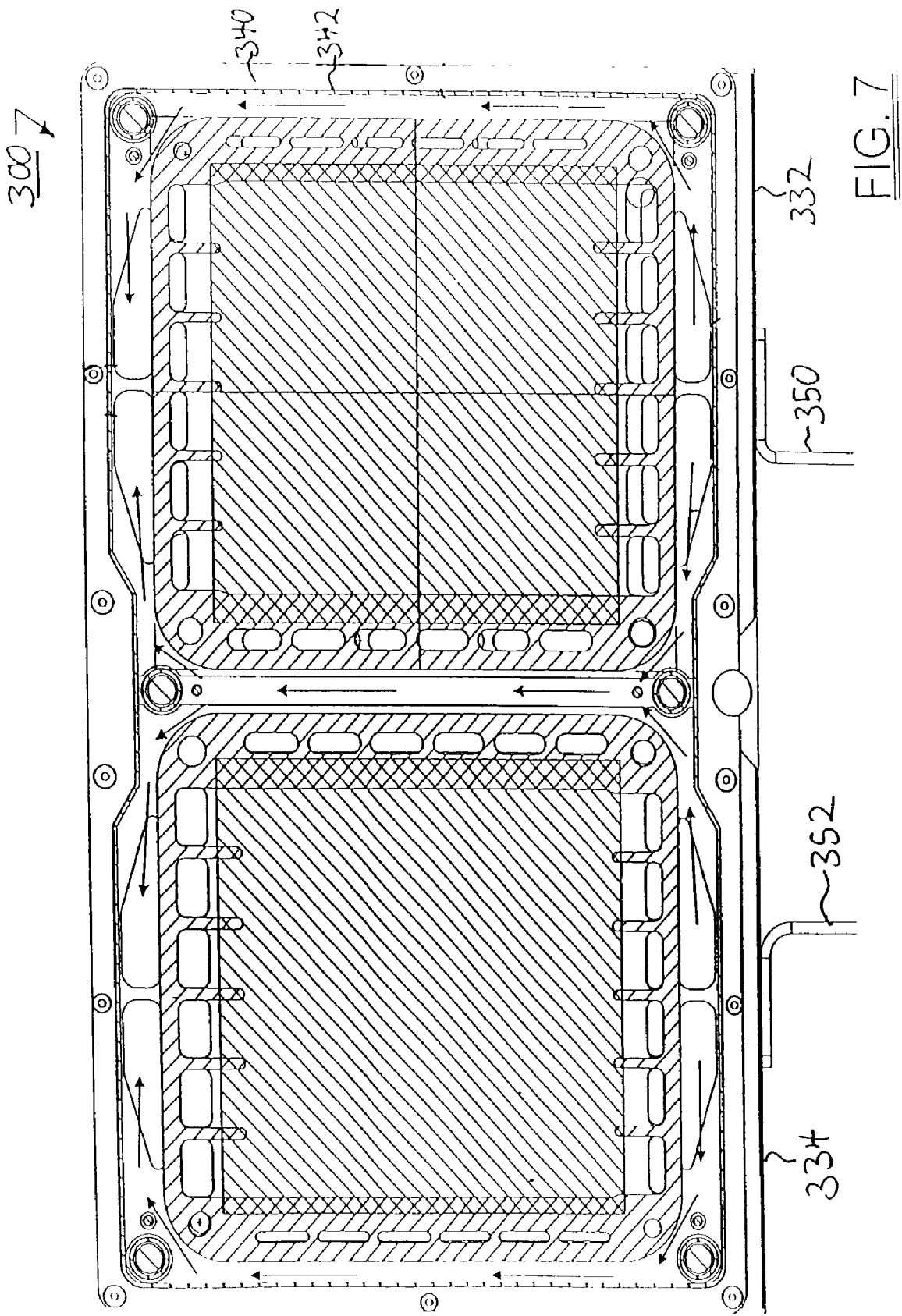
FIG. 7 is an equatorial cross-sectional view taken along line 7-7 in FIG. 4.

Referring to FIG. 2, a schematic mechanization diagram of a solid-oxide fuel cell system 12 in accordance with the invention includes auxiliary equipment and controls.

A conventional high speed inlet air pump 48 draws inlet air 50 through an air filter 52, past a first MAF sensor 54, through a sonic silencer 56, and through a cooling shroud 58 surrounding pump 48. Air output 60 from pump 48, is first split into branched conduits between a feed 62 and a feed 72. Feed 62 goes as burner cooling air 64 to a tail gas afterburner 66. Feed 72 is further split into branched conduits between an anode air feed 74 and a cathode air feed 75. Anode feed 74 goes to a hydrocarbon fuel vaporizer 76. A portion of anode air feed 74 may be controllably diverted by control valve 82 through the cool side 83 of reformate pre-heat heat exchanger 84, then recombined with the non-tempered portion such that feed 74 is tempered to a desired temperature on its way to vaporizer 76. Downstream of vaporizer 76 is a start-up combustor 77 having an igniter 79. During start-up, when the reformer is cold or well below operating temperature, vaporized fuel is ignited in combustor 77 and the burned gas is passed directly through the reformer to warm the plates therein more rapidly.

Cathode air feed 75 is controlled by cathode air control valve 86 and may be controllably diverted by cathode air preheat bypass valve 88 through the cool side 90 of cathode air pre-heat heat exchanger 92 on its way to stacks 44,46. After passing through the cathode sides of the cells in stacks 44,46, the partially spent, heated air 93 is fed to burner 66.

A hydrocarbon fuel feed pump 94 draws fuel from a storage tank 96 and delivers the fuel to a fuel injector 102 which injects the fuel into vaporizer 76. The injected fuel is combined with air feed 74, vaporized, and fed to a reformer catalyst 104 in main fuel reformer 106 which reforms the fuel to, principally, hydrogen and carbon monoxide. Reformate 108 from catalyst 104 is fed to the anodes in stacks 44,46. Unconsumed fuel 110 from the anodes is fed to afterburner 66 where it is combined with air supplies 64 and 93 and is burned. The hot burner gases 112 are passed through a cleanup catalyst 114 in main reformer 106. The effluent 115 from catalyst 114 is passed through the hot sides 116,118 of heat exchangers 84, 92, respectively, to heat the incoming cathode and anode air. The partially-cooled effluent 115 is fed to a manifold 120 surrounding stacks 44,46 from whence it is eventually exhausted 122.

For clarity of presentation and to enhance the reader's understanding, the numbers of elements of the invention as presented further below are grouped in century series depending upon the functional assembly in which the elements occur; therefore, elements recited above and shown in FIGS. 1 and 2 may have different numerical designators when shown and discussed below, e.g., stacks 44,46 become stacks 344,346.

Referring to FIGS. 3 through 7, in a fuel cell stack assembly 300 in accordance with the invention, the cells 311 are arranged side-by-side and may comprise a plurality of cells 311, respectively, such that each of first stack 344 and second stack 346 is a stack of identical fuel cells 311. The plurality of cells is preferably about 30 in each of the two stacks. The cells 311 in stack 344 and stack 346 are connected electrically in series by interconnect 347, and the stacks are connected in series with cathode current collector 332 and anode current collector 334 on the bottom of the stacks. The current collectors are sized to have a "footprint" very close to the same dimension as a cover-sealing flange 340. The current collectors preferably are adhesively sealed to a stack mounting plate 338, and the stacks preferably are in turn adhesively sealed to the current collectors. The sealing flange 340 for the cover 342 and top 343 is then mounted and sealed to the current collector plates. A gasket 341 between flange 340 and the current collectors is a dielectric so that flange 340 does not cause a short between the current collectors. Power leads 350,352 are attached to current collectors 332,334, respectively, through strong, reliable and highly conductive metallurgical bonds, such as brazing.

Figure 8:
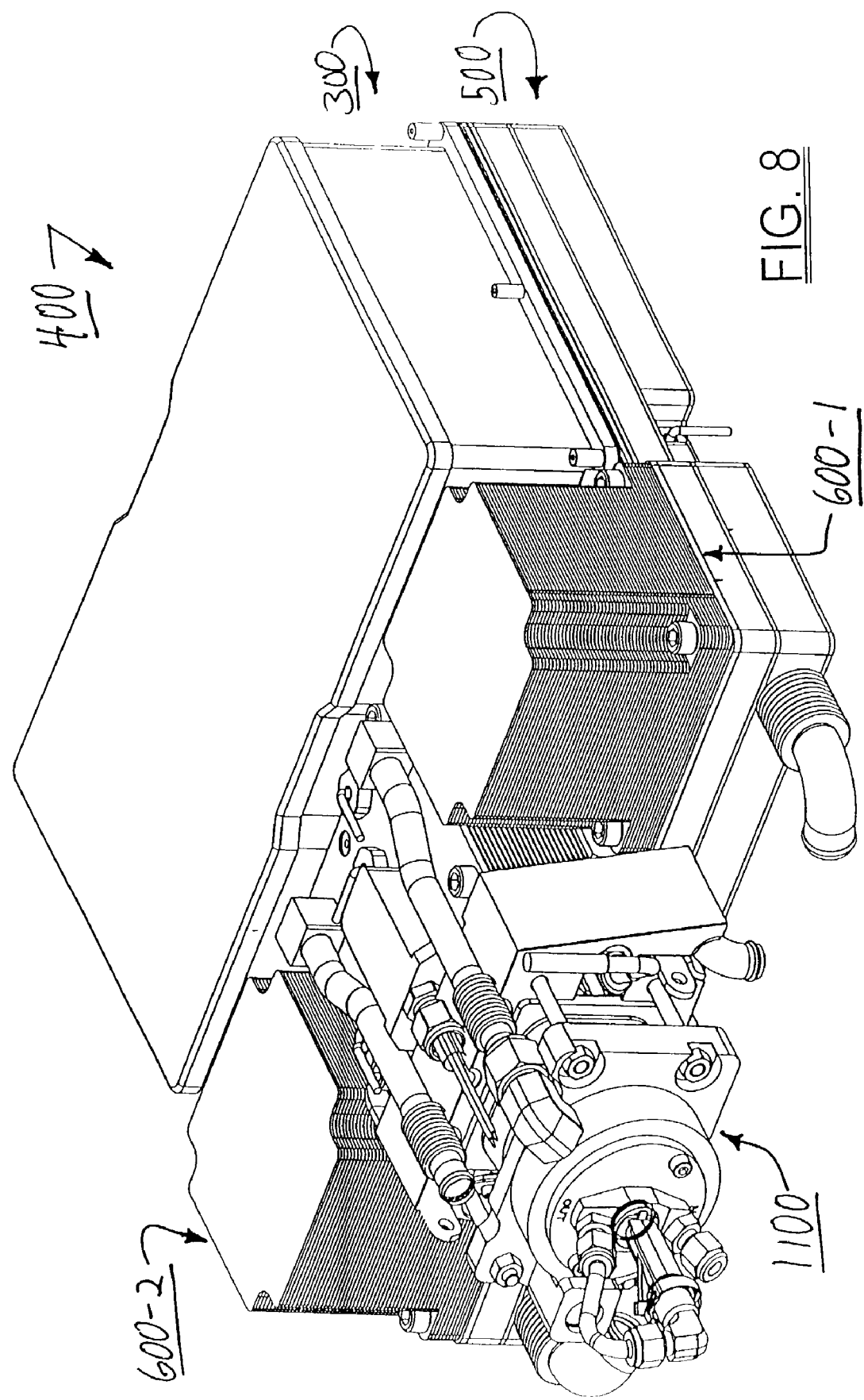
FIG. 8 is an isometric view from above, showing a fuel cell assembly comprising the apparatus of FIG. 4 mounted on a manifold in accordance with the invention, along with reforming, combusting, and heat exchanging apparatus for servicing the fuel cell stacks.
Figure 9:
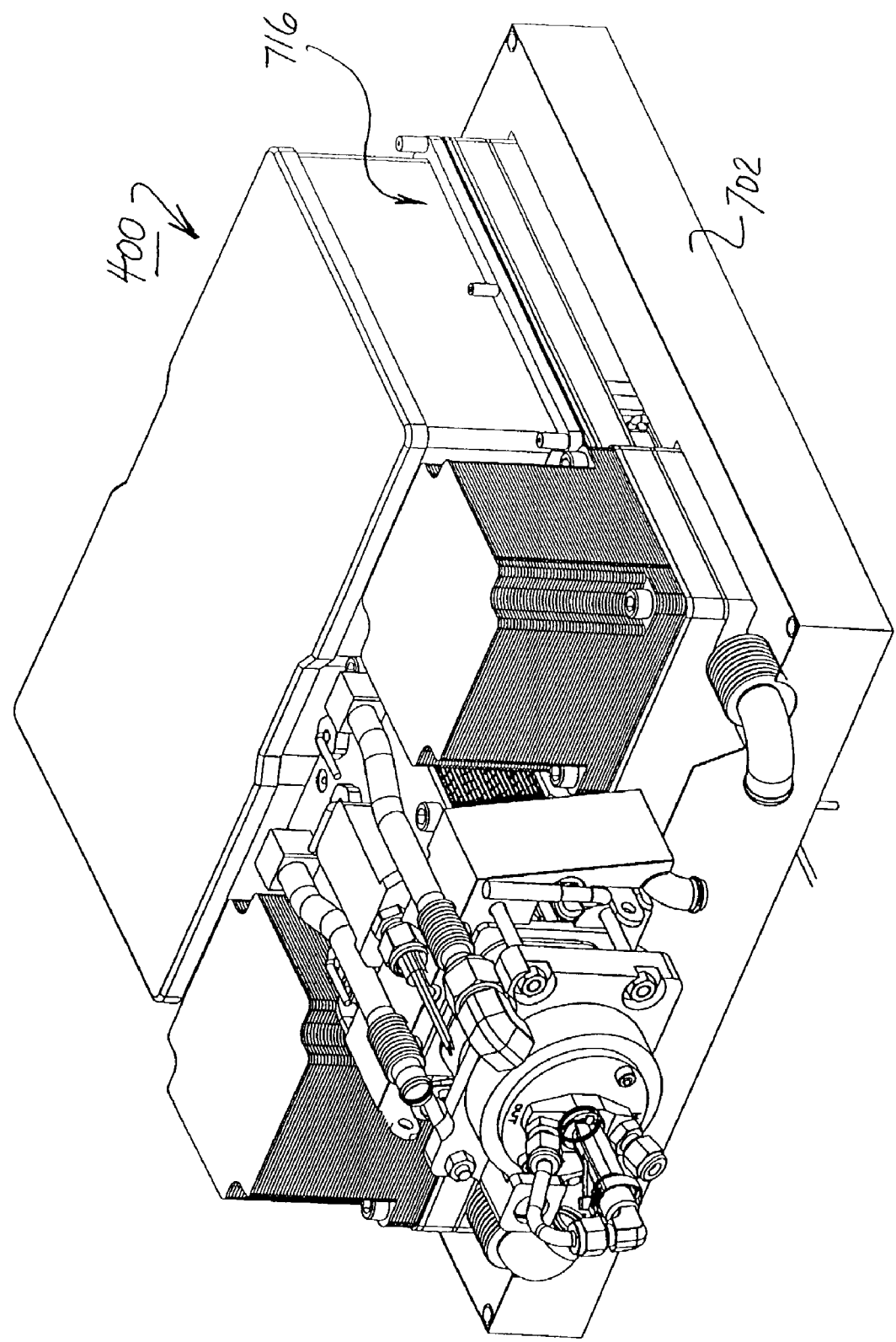
FIG. 9 is an isometric view from above, showing the fuel cell assembly of FIG. 8 mounted in the lower element of a thermal enclosure.
Figure 10:
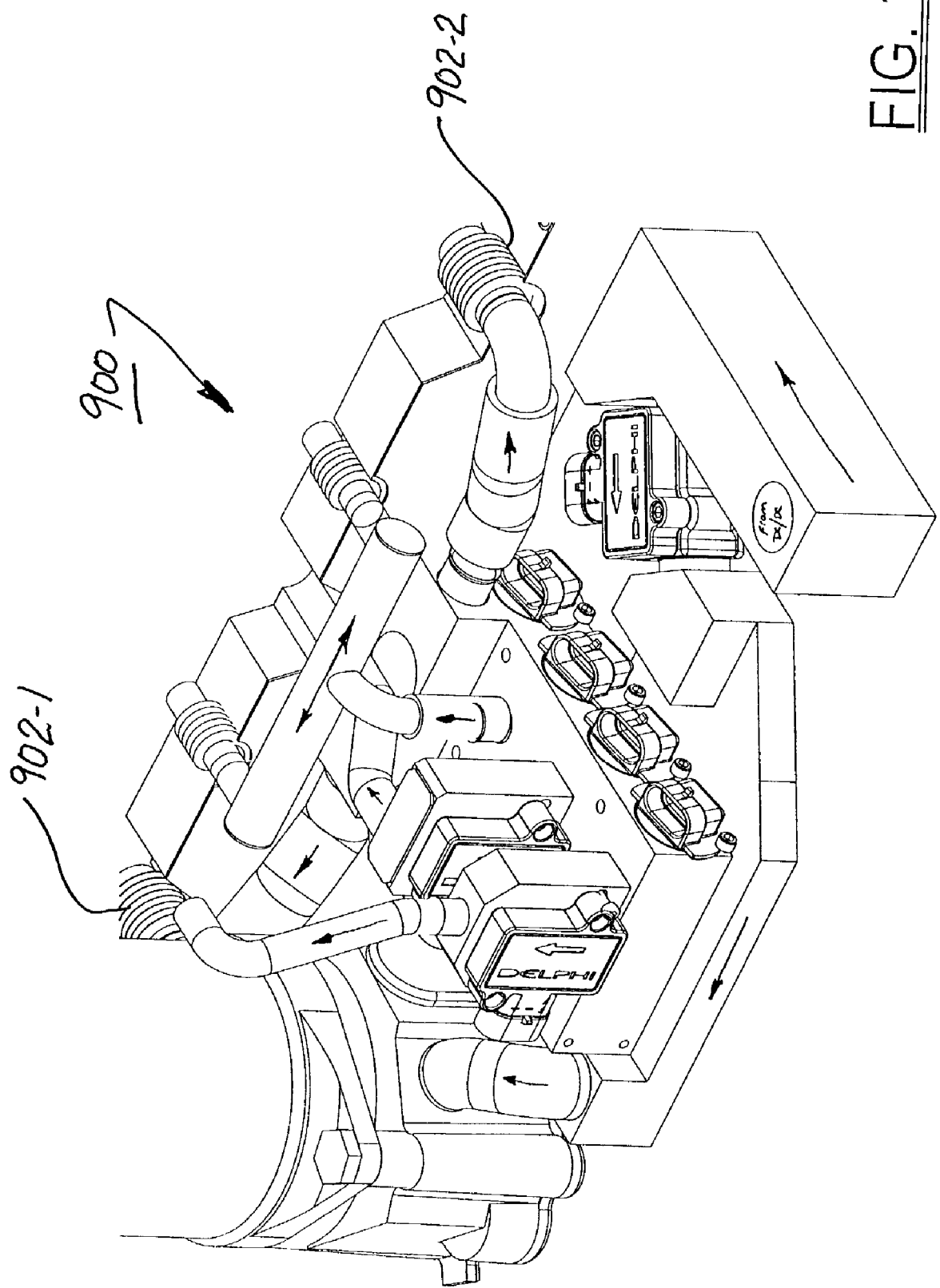
FIG. 10 is an isometric view from above of an air supply assembly for controllably providing air to the fuel cell assembly shown in FIGS. 8 and 9.
Figure 11:
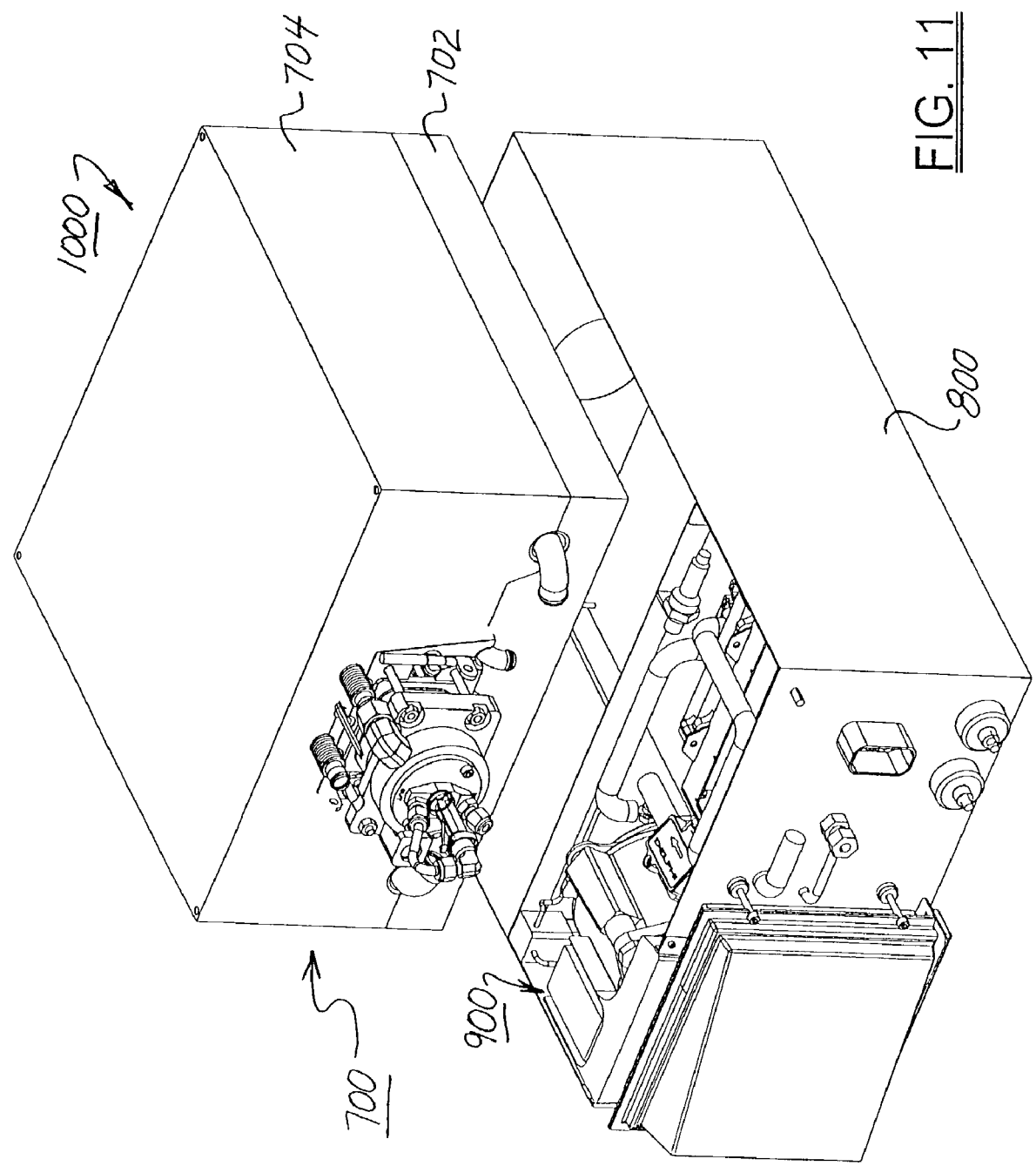
FIG. 11 is an exploded isometric view of a fuel cell system in accordance with the invention, showing the air supply assembly of FIG. 10 disposed in a structural enclosure, and showing the fuel cell assembly of FIG. 9 fully enclosed by both upper and lower elements of a thermal enclosure.

Referring to FIG. 8, a fuel cell assembly 400 in accordance with the invention comprises stack assembly 300 operatively mounted on an integrated fuel/air manifold assembly 500 which also supports first and second cathode air heat exchangers 600 and an integrated fuel reformer and waste energy recovery unit ("reforWER") 1100. Assembly 400 receives air from air supply system 900 (FIGS. 10-12) as described below and selectively preheats air going to the reformer. ReforWER 1100 reforms hydrocarbon fuel, such as gasoline, into reformate fuel gas comprising mostly hydrogen, carbon monoxide, and lower-molecular weight hydrocarbons, tempers the air and reformate entering the stacks, selectively burns fuel not consumed in the stacks, recovers heat energy generated in various internal processes which would otherwise be wasted, and exhausts spent air and water.

Figure 12:
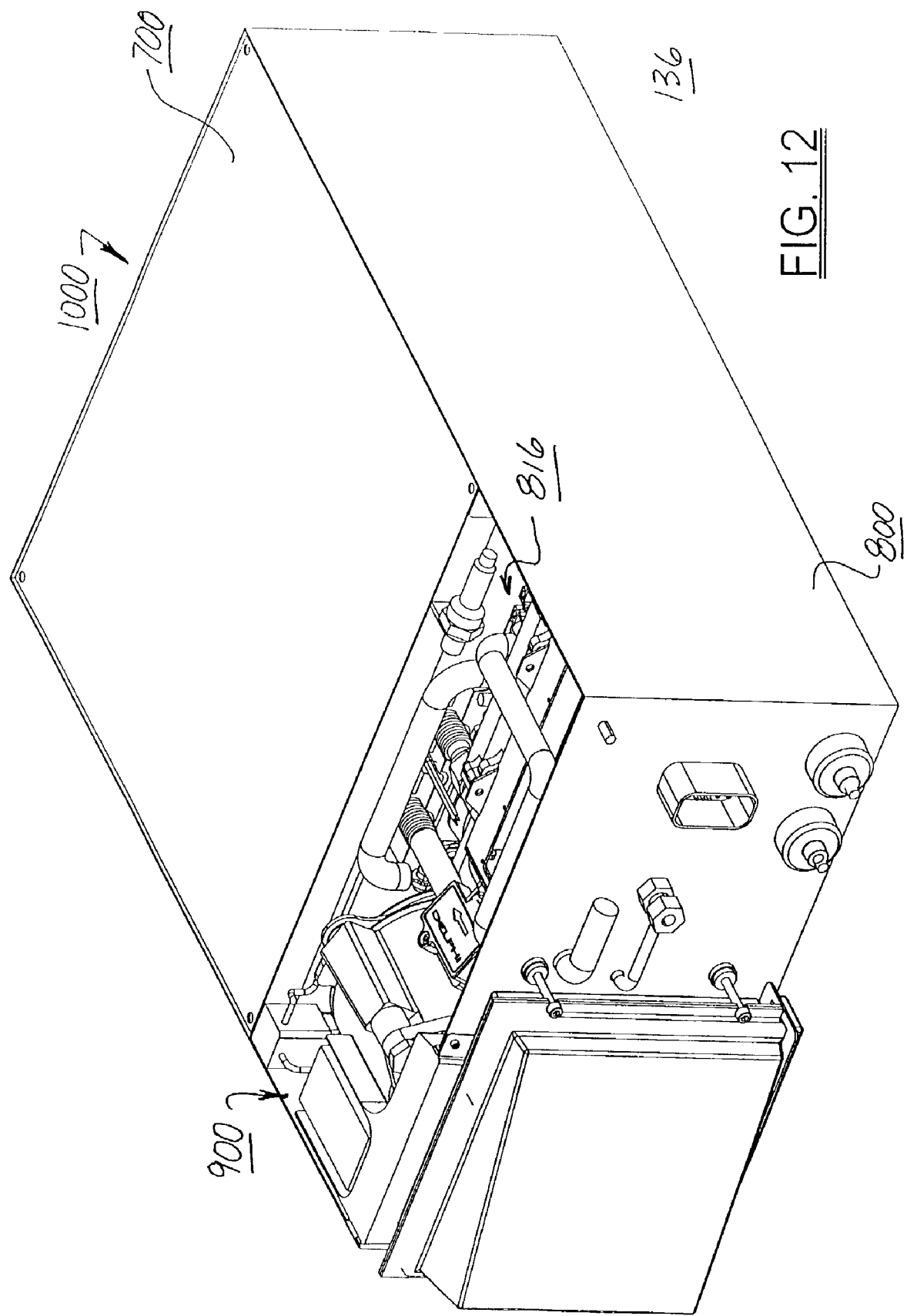
FIG. 12 is an isometric view from above of a fully assembled fuel cell system in accordance with the invention, with the top cover removed for clarity.

Referring to FIGS. 9 through 12, enclosure of the fuel cell assembly comprises two nested enclosures: a thermal enclosure 700 and a structural enclosure 800. Fuel cell assembly 400 is first disposed in a "clam-shell" type thermal enclosure 700, comprising a bottom portion 702 and a top portion 704, which in turn is disposed in a structural enclosure 800. A "hot zone" 716 is contained in thermal enclosure 700 and a "cool zone" is contained in structural enclosure 800 (FIG. 12). Thermal enclosure 700 may be formed of any suitable high-temperature high-efficiency insulating material, as is known in the insulating art, and may be a composite including a light-weight metal case.

Structural enclosure 800 preferably is fabricated from thicker metal, for example, to provide structural strength and a simple shape, such as a box with a removable lid, for ease of fabrication. Features such as brackets, studs, electrical connectors, studs, weld-nuts, air intake ducts, and exhaust ducts, for example, may be part of the structural enclosure for mounting internal components thereto and for connecting the system to external structures. Features for vibration and shock isolation (not shown) may also be provided with the enclosure.

Figure 13:
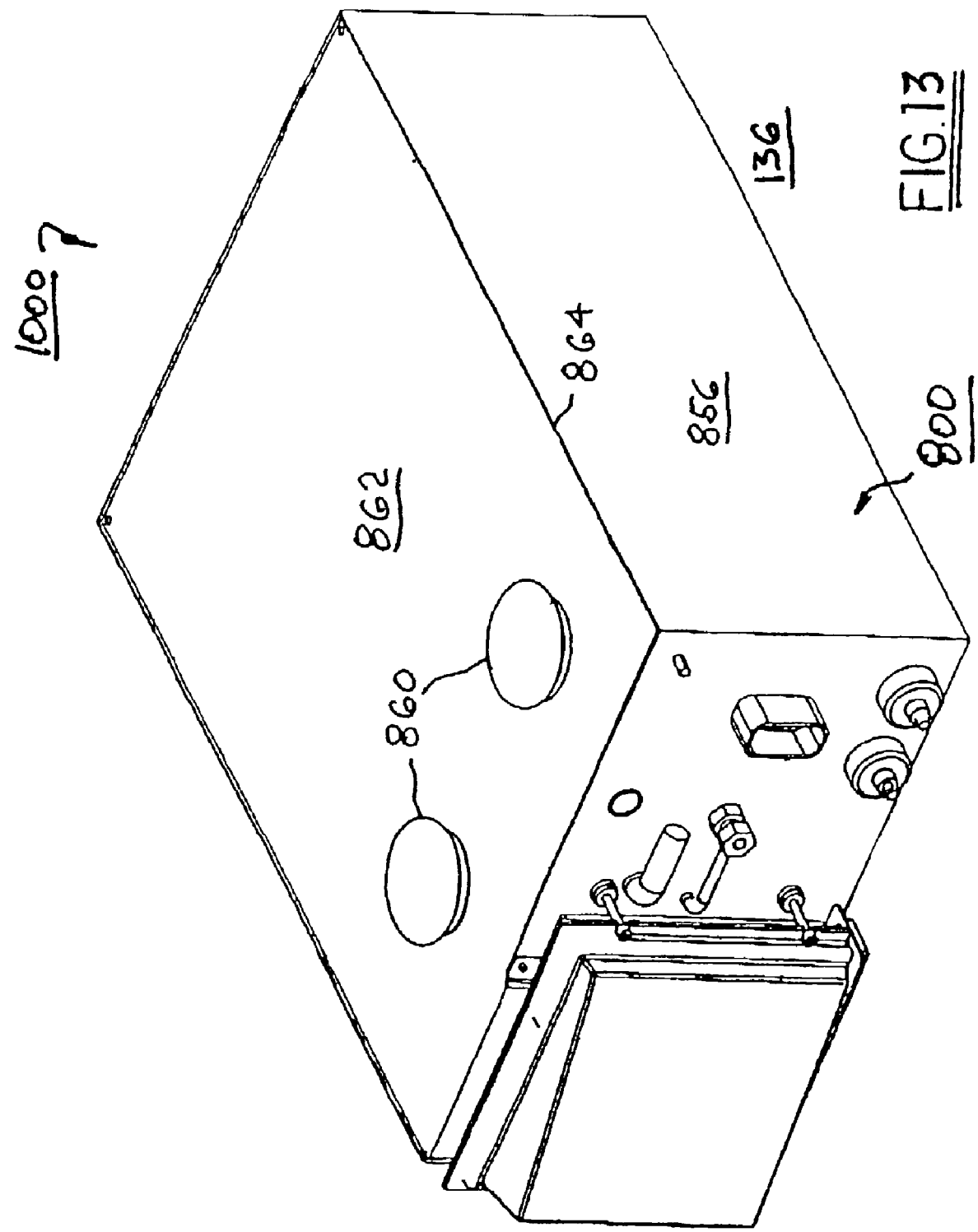
FIG. 13 is an isometric view from above like that shown in FIG. 12 but with the top cover in place and having cooling air outlet vents in accordance with the invention.
Figure 14:
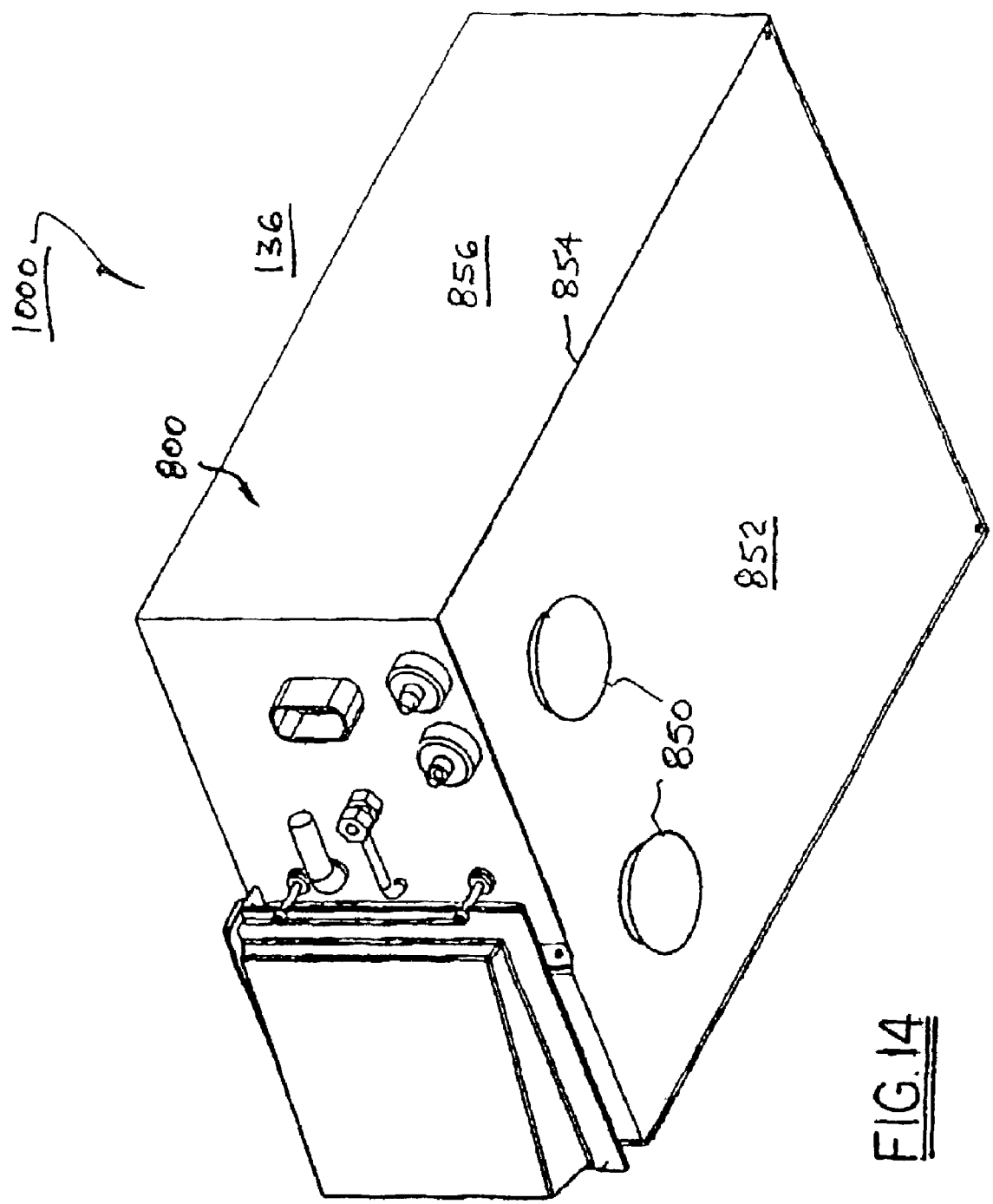
FIG. 14 is an isometric view from below of the system shown in FIG. 13, showing cooling air inlet vents in the bottom of the structural enclosure.
Figure 15:
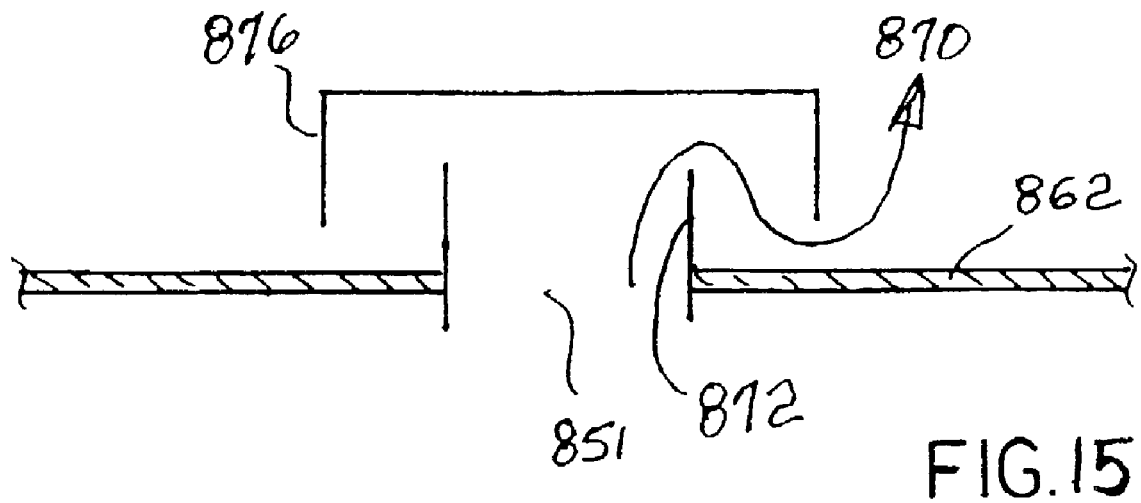
FIG. 15 is a cross-sectional view, partially schematic, of a cooling air outlet vent in accordance with the invention.
Figure 16:
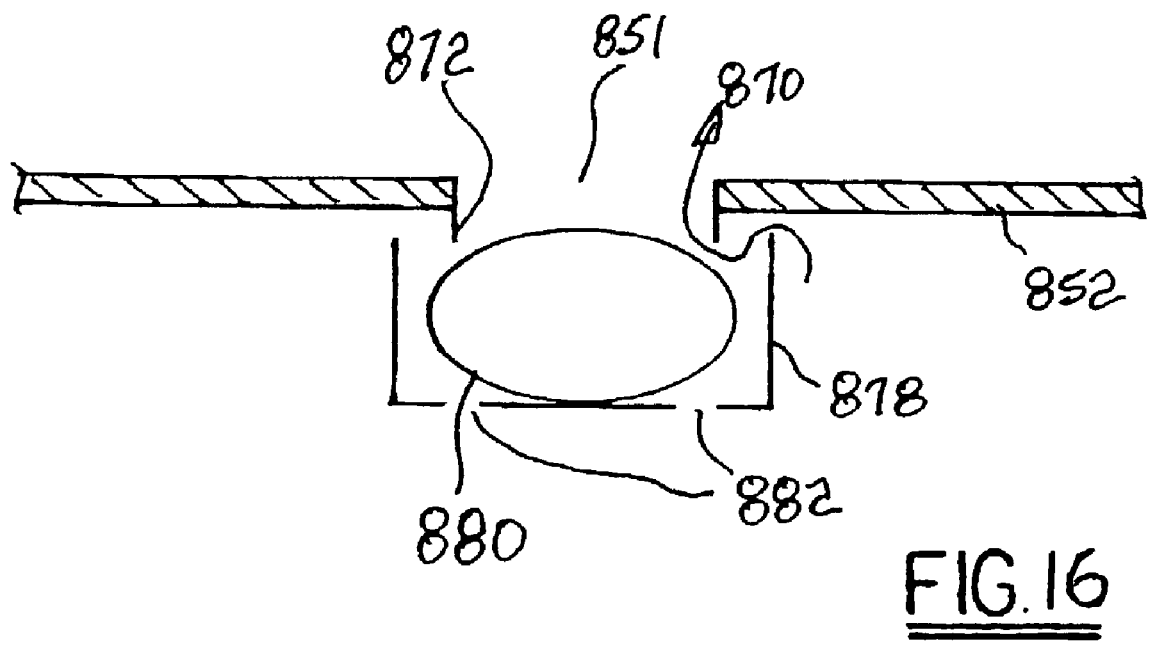
FIG. 16 is a cross-sectional view, partially schematic, of a cooling air inlet vent in accordance with the invention.

Referring to FIGS. 13 through 16, structural enclosure 800 is provided with one or more convective cooling air inlet vents 850, preferably disposed in the bottom wall 852 of the enclosure, as shown in FIG. 14, or near the lower edge 854 of side wall 856 (not shown). Enclosure 800 is further provided with one or more convective cooling air outlet vents 860, preferably disposed in the top cover 862 of the enclosure, as shown in FIG. 13, or near the upper edge 864 of side wall 856 (not shown). Vents 850,860 comprise openings or ports 851 through the respective walls of enclosure 800 in the portion of the structure enclosing the cool zone. During any mode of operation of the SOFC system in which the temperature in the cool zone rises above the ambient temperature outside the enclosure, a buoyancy-induced convective airflow is induced, warm air flowing out of the enclosure through outlet vents 860, and cool air being drawn into the enclosure through inlet vents 850. This system is self-regulating because as temperature rises in the enclosure so does the mass-flow of cooling air. Of course, if desired a small auxiliary exhaust fan (not shown) may be mounted at one of the vents, but the preferred embodiment relies solely on thermal convective air flow.

The vents may employ baffles to deflect unwanted splash and intrusion of dirt or other contaminants. Thus, each vent includes a labyrinthine air flow path 870 between a baffle 872 surrounding ports 851 and a cap 876,878. To guard against flooding of the enclosure in the event of high water level outside the system, a float 880 may be included within cap 878 to rise and form a seal against baffle 872, thus preventing water from entering the enclosure through ports 851. Further, cap 878 may be provided with weep holes 882 such that any moisture which may accumulate within the cool zone of the enclosure can drain from the enclosure by gravity.

The air control assembly 900 is connected to elements of fuel cell assembly 400. Assemblies 400,900 are then installed within structural enclosure 800, as shown in FIG. 12, to form a fuel cell system 1000 in accordance with the invention.

Preferably, control system 200 (shown schematically in FIG. 2 as power conditioner 202, circuit protection I/O 204, drivers 206, and electronic control unit 208, but not visible in FIG. 12) is also installed onboard the system within cool zone 816.

Figure 17:
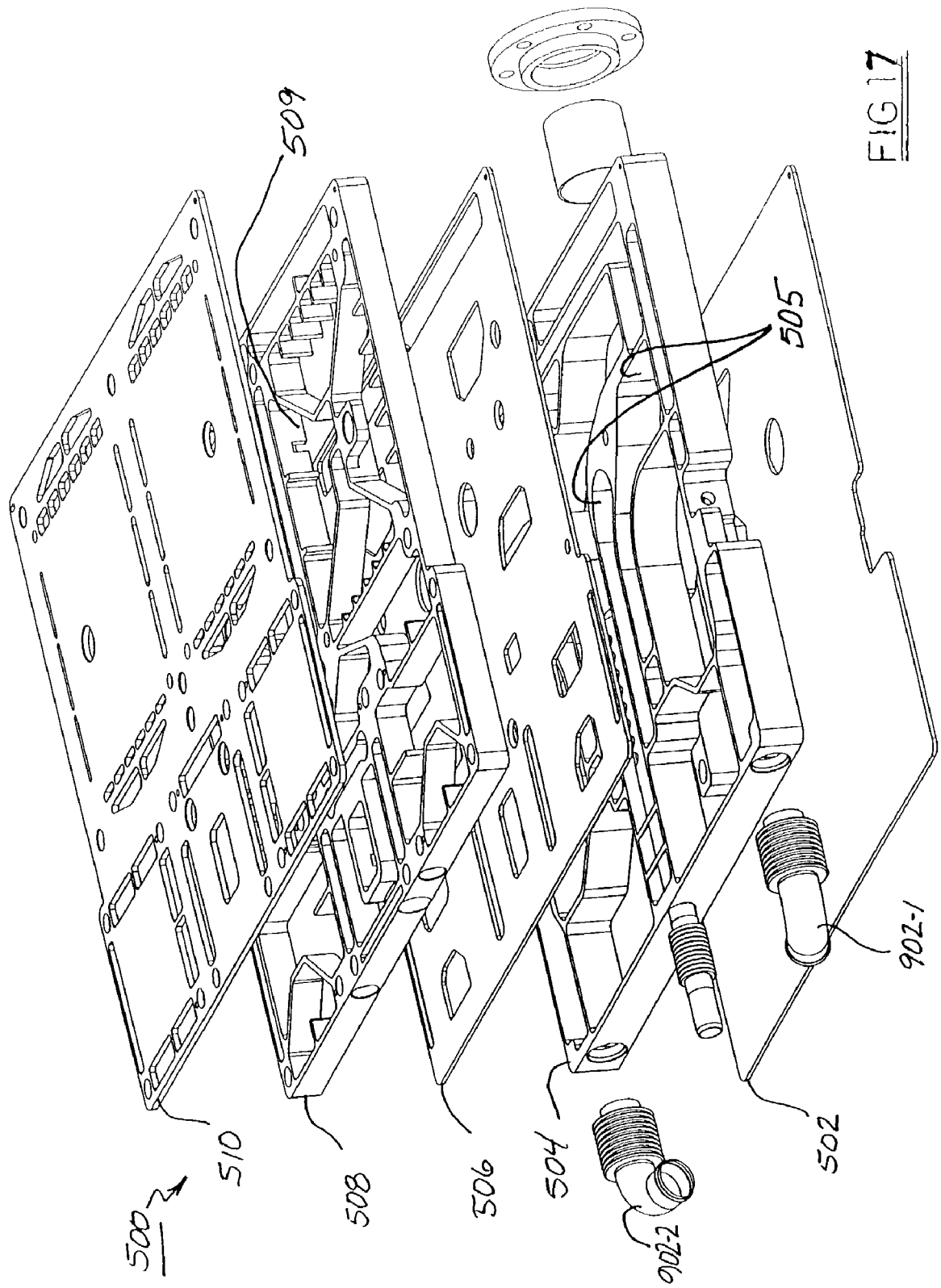
FIG. 17 is an exploded isometric view from the front, showing a multi-element basal manifold in accordance with the invention for distributing air and reformate fuel and exhaust products through and around the fuel cell stacks, as shown in FIG. 8.

Referring to FIG. 17, an integrated fuel/air manifold assembly 500 receives air from air supply assembly 900 (FIG. 10) and reformed fuel from reformer assembly 1100 (FIG. 8) and conveys high temperature air, exhaust, and hydrogen-rich reformate fuel to and from the core components of the system. Basal manifold assembly 500 is shown in FIG. 17 as comprising a three-dimensional assembly of three perforated plates and two partitioned elements which comprise a two-level network of passageways which allow for the mounting, close-coupling, and integration of critical fuel cell system components, including heat exchangers, combustors, fuel reformers, solid-oxide fuel cell stacks, check valves, threaded inserts, and catalyzed and non-catalyzed filters.

Bottom plate 502 is the base plate for the manifold and forms the bottom for various chambers formed by combination of plate 502 with lower partitioned element 504, defining a lower distribution element 505. Intermediate plate 506 completes the chambers in element 504 and forms the bottom plate for upper partitioned element 508, defining an upper distribution element 509. Top plate 510 completes the chambers in element 508 and forms the mounting base for fuel cell assembly 300, heat exchangers 600, and reforWER unit 1100, as described above.

An SOFC system 1000 in accordance with the invention is especially useful as an auxiliary power unit (APU) for vehicles 136 (FIG. 12) on which the APU may be mounted, such as cars and trucks, boats and ships, and airplanes, wherein motive power is supplied by a conventional engine and the auxiliary electrical power needs are met by an SOFC system.

An SOFC assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system for generating electric power by combination of oxygen with hydrogen-containing fuel, comprising:
    a) a plurality of individual fuel cells organized into at least one fuel cell stack assembly including a plurality of cathodes and anodes;
    b) a reformer for reforming hydrocarbons to provide said fuel;
    c) an air supply system for supplying said oxygen in the form of cathode air;
    d) an integrated fuel/air manifold for receiving said fuel from said reformer, conveying said fuel to said anodes, and returning said fuel as tail gas from said anodes, and for receiving said cathode air from said air supply system, conveying said cathode air to said cathodes, and returning said cathode air from said cathodes;
    e) a thermal enclosure for housing at least one of said fuel cells, said reformer, and said manifold in a hot zone therein; and
    f) a structural enclosure for housing said thermal enclosure and for housing said air supply system in a cool zone outside of said thermal enclosure, said structural enclosure including at least one cooling air inlet vent and at least one cooling air outlet vent that allow cooling air to pass into and out of said cool zone, wherein said at least one inlet vent is disposed below said at least one outlet vent for allowing thermal convective cooling of said air supply system within said cool zone by said cooling air, wherein said cooling air is separate from said cathode air being provided by said air supply system and integrated fuel/air manifold to said cathodes.

2. A fuel cell system in accordance with claim 1 wherein said fuel cells are solid-oxide fuel cells.

3. A fuel cell system in accordance with claim 1 comprising a plurality of said inlet and outlet vents.

4. A fuel cell system in accordance with claim 1 wherein said at least one outlet vent is disposed in a top cover of said structural enclosure.

5. A fuel cell system in accordance with claim 1 wherein said at least one inlet vent is disposed in a bottom wall of said enclosure.

6. A fuel cell system in accordance with claim 5 wherein said inlet vent includes a float valve for preventing ingress of water into said enclosure.

7. A fuel cell system in accordance with claim 1 wherein at least one of said at least one inlet vent and said at least one outlet vent include labyrinthine passages for entrance and exit, respectively, of cooling air to and from said enclosure.

8. A fuel cell system in accordance with claim 1 wherein said structural enclosure is formed as a metal box.

9. A fuel cell system in accordance with claim 1 wherein said system is mounted on a vehicle.

10. A fuel cell system in accordance with claim 9 wherein said vehicle is selected from the group consisting of car, truck, boat, and airplane.

11. A fuel cell system in accordance with claim 10 wherein said system is an auxiliary power unit for said vehicle.

12. An automotive vehicle, comprising a fuel cell system for generating auxiliary power for said vehicle, said system including
    a plurality of individual fuel cells organized into at least one fuel cell stack assembly including a plurality of cathodes and anodes,
    a reformer for reforming hydrocarbons to provide fuel to said fuel cells,
    an air supply system for supplying cathode air to said fuel cells,
    an integrated fuel/air manifold for receiving said fuel from said reformer, conveying said fuel to said anodes, and returning said fuel as tail gas from said anodes, and for receiving said cathode air from said air supply system, conveying said cathode air to said cathodes, and returning said cathode air from said cathodes,
    a thermal enclosure for housing at least one of said fuel cells, said reformer, and said manifold in a hot zone therein, and
    a structural enclosure for housing said thermal enclosure and for housing said air supply system in a cool zone outside of said thermal enclosure, said structural enclosure including at least one cooling air inlet vent and at least one cooling air outlet vent that allow cooling air to pass into and out of said cool zone, wherein said at least one inlet vent is disposed below said at least one outlet vent for allowing thermal convective cooling of said air supply system within said cool zone by said cooling air, wherein said cooling air is separate from said cathode air being provided by said air supply system and integrated fuel/air manifold to said cathodes.

13. A structural enclosure for housing components of a fuel cell system, said structural enclosure including a cool zone having at least one cooling air inlet vent and at least one cooling air outlet vent that allow cooling air to pass into and out of said cool zone, wherein an air supply system for supplying oxygen in the form of air to a cathode is housed in said cool zone, wherein said at least one inlet vent is disposed below said at least one outlet vent for allowing thermal convective cooling of said air supply system within said cool zone by said cooling air, wherein said cooling air is separate from cathode air being provided to at least one cathode.

14. A fuel cell system in accordance with claim 1 further comprising a baffle surrounding at least one of said inlet vent and said outlet vent.

15. A fuel cell system in accordance with claim 7 further comprising a baffle surrounding at least one of said inlet vent and said outlet vent, and a cap covering said inlet vent and said outlet vent having said baffle, wherein said labyrinthine passage is formed between said baffle and said cap.

16. A fuel cell system in accordance with claim 1 wherein a control system is housed within said cool zone, wherein said at least one inlet vent is disposed below said at least one outlet vent for allowing thermal convective cooling of said control system within said cool zone by said cooling air.

17. A fuel cell system in accordance with claim 16 wherein said control system includes at least one of a power conditioner, a circuit protection I/O, a driver, and an electronic control unit.

* * * * *